United States Patent [19]
Pfetzer

[11] Patent Number: 6,109,301
[45] Date of Patent: Aug. 29, 2000

[54] MULTIPLE MAGNETIC VALVE FOR A LIQUID-REGULATED HEATING AND/OR COOLING INSTALLATION

[75] Inventor: Johannes Pfetzer, Buehl, Germany

[73] Assignee: Robert Bosch GmbH, Stuttgart, Germany

[21] Appl. No.: 09/297,458

[22] PCT Filed: Aug. 1, 1998

[86] PCT No.: PCT/DE98/02208

§ 371 Date: May 1, 1999

§ 102(e) Date: May 1, 1999

[87] PCT Pub. No.: WO99/28142

PCT Pub. Date: Jun. 10, 1999

[30] Foreign Application Priority Data

Dec. 3, 1997 [DE] Germany .......................... 197 53 575

[51] Int. Cl.[7] .................................................. F16K 11/10
[52] U.S. Cl. ................. 137/599.14; 137/601.14
[58] Field of Search .................. 137/599.11, 599.14, 137/601.14, 625.29, 625.41

[56] References Cited

U.S. PATENT DOCUMENTS

| | | |
|---|---|---|
| 1,253,344 | 1/1918 | Braun . |
| 2,758,447 | 8/1956 | Prosek . |
| 3,109,454 | 11/1963 | Whitlock et al. . |
| 4,304,259 | 12/1981 | Brunner .................. 137/599.1 |
| 5,184,773 | 2/1993 | Everingham .................. 137/625.5 |
| 5,443,241 | 8/1995 | Odaira et al. .................. 251/129.07 |
| 5,564,458 | 10/1996 | Roth et al. .................. 137/115.06 |

FOREIGN PATENT DOCUMENTS

| | | |
|---|---|---|
| 19627655 | 7/1996 | Germany . |
| 0 653 990 B1 | 1/1997 | Germany . |

*Primary Examiner*—Stephen M. Hepperle
*Attorney, Agent, or Firm*—Michael J. Striker

[57] ABSTRACT

The invention is based on a magnet valve (10) for a fuel-regulated heating and/or cooling system, having a valve housing (16) that has an inlet conduit (18), an outlet conduit (20, 22), a return conduit (98), and a bypass conduit (24, 26) between the inlet conduit (18) and the return conduit (98), and having an electromagnetically switched valve member (32, 34) and bypass valve member (36, 38), which are secured together with an armature (86, 88) to a lifting rod (52, 54), and the valve member (32, 34) establishes the communication between the inlet conduit (18) and the outlet conduit (20, 22) and blocks it in a switching position in which it is supplied with current, while the bypass valve member (36, 38) controls the communication between the bypass conduit (24, 26) and the return conduit (98) as a function of the feed flow in the currentless switching position and establishes it in the switching position in which it is supplied with current.

It is proposed that a plurality of valve units (12, 14) are provided, whose inlet conduits (18) communicate with one another.

9 Claims, 3 Drawing Sheets

MULTIPLE MAGNETIC VALVE FOR A LIQUID-REGULATED HEATING AND/OR COOLING INSTALLATION

PRIOR ART

The invention is based on a magnet valve for a fuel-regulated heating and/or cooling system having the characteristics of the preamble to claim 1.

One such magnet valve is known from European Patent Disclosure EP 0 653 990 B1. It is used in particular in fluid-regulated heat exchangers for heating and/or air conditioning systems in motor vehicles. It can be triggered in clocked fashion as a function of temperatures in the heating and/or air conditioning system or in a passenger compartments, and the flow rate required for the heating is determined essentially by the mean time cross section. The time cross section is determined by the time integral of the effective opening cross section. By the fluid pressure in an inlet conduit and/or by a valve spring, a valve member of the magnet valve is opened toward an outlet conduit, and it is closed by a magnet coil, which is supplied with current, of the magnet valve by acting on an armature connected to a lifting rod.

Also seated on the lifting rod, which is lengthened past the valve member, is a bypass valve member that controls a bypass conduit disposed between the inlet conduit and a return conduit. The valve member and the bypass valve member are adapted to one another and to a valve spring in such a way that in the currentless state of the magnet coil, the flow quantity to the outlet conduit is kept constant, regardless of a higher feed volume of a pump. As a result, the time cross section needs to be regulated only as a function of temperature, and not as a function of the feed flow of the pump. The feed flow of the pump, which as a rule is driven by an internal combustion engine, in fact varies with the rotary drive speed, or in other words with the engine rpm.

ADVANTAGES OF THE INVENTION

According to the invention, a plurality of valve units are provided, whose inlet conduits communicate with one another. They are triggerable separately and are associated with various heating heat exchangers. As a result, by simple means, a plurality of heating loops for various locations in a vehicle, for instance for the driver side and the front passenger side, can be regulated separately and independently of one another.

In the currentless state of the valve units, the flow quantity to the outlet conduits is kept constant regardless of a higher inlet flow from the pump. It is expedient for the effective diameters of the valve seats, valve members and bypass valve members and the force of their valve springs are adapted to one another in such a way that the flow quantity in the currentless state is the same for all the valve units and is maintained for those valve units that are currentless even whenever individual valve units are supplied with current. The pressure in the system is thus prevented from rising when the valves are closed and from causing pressure surges. If the valve springs are designed such that the bypass valve members do not open until a given flow to the heat exchangers, such as 1600 liters per hour, then in this range of the feed quantity of the pump there is no loss of heating capacity, since the entire inflow to the valve units is carried on to the heating heat exchangers.

In one feature of the invention, the valve units are disposed in a common valve housing. External connecting lines between the valve units can be dispensed with.

Internal connecting conduits and bypass conduits also reduce the expense for the connections, and the pressure rise is substantially less, so that smaller magnetic circuits can be used. As a result, the costs, use of material, structural volume and weight are all reduced.

The return conduit of the magnet valve can expediently be combined with the return line of the heating heat exchangers in the magnet valve itself, by providing that the return conduit has a suitable connection. If for reasons of given conditions at certain locations in the vehicle the return line can be laid over a shorter or more suitable path, then the return conduit is connected to the return line at is some suitable point outside the magnet valve.

It is also expedient to provide separate valve chambers with replaceable valve seats for either one or all of valve units. Thus the magnet valve can be adapted for various applications at little effort or expense, by replacing the valve chambers and the valve seats. The valve seats are advantageously made from an elastomer. The elasticity and damping property of the material reduces the closing noise and wear to the valve members.

DRAWING

Further advantages will become apparent from the following description of the drawing. Exemplary embodiments of the invention are shown in the drawing. The description and the claims include numerous characteristics in combination. One skilled in the art will also consider the characteristics individually in an expedient way and combine them to make useful further combinations. Shown are:

FIG. 1, a cross section through a magnet valve of the invention with two valve units, and FIG. 2, a section along the line II—II of FIG. 1, in which a lifting rod of the valve unit is shown in an intermediate position;

FIG. 3, an installation diagram; and

FIG. 4, a variant of FIG. 3.

DESCRIPTION OF THE EXEMPLARY EMBODIMENTS

Figure 1:
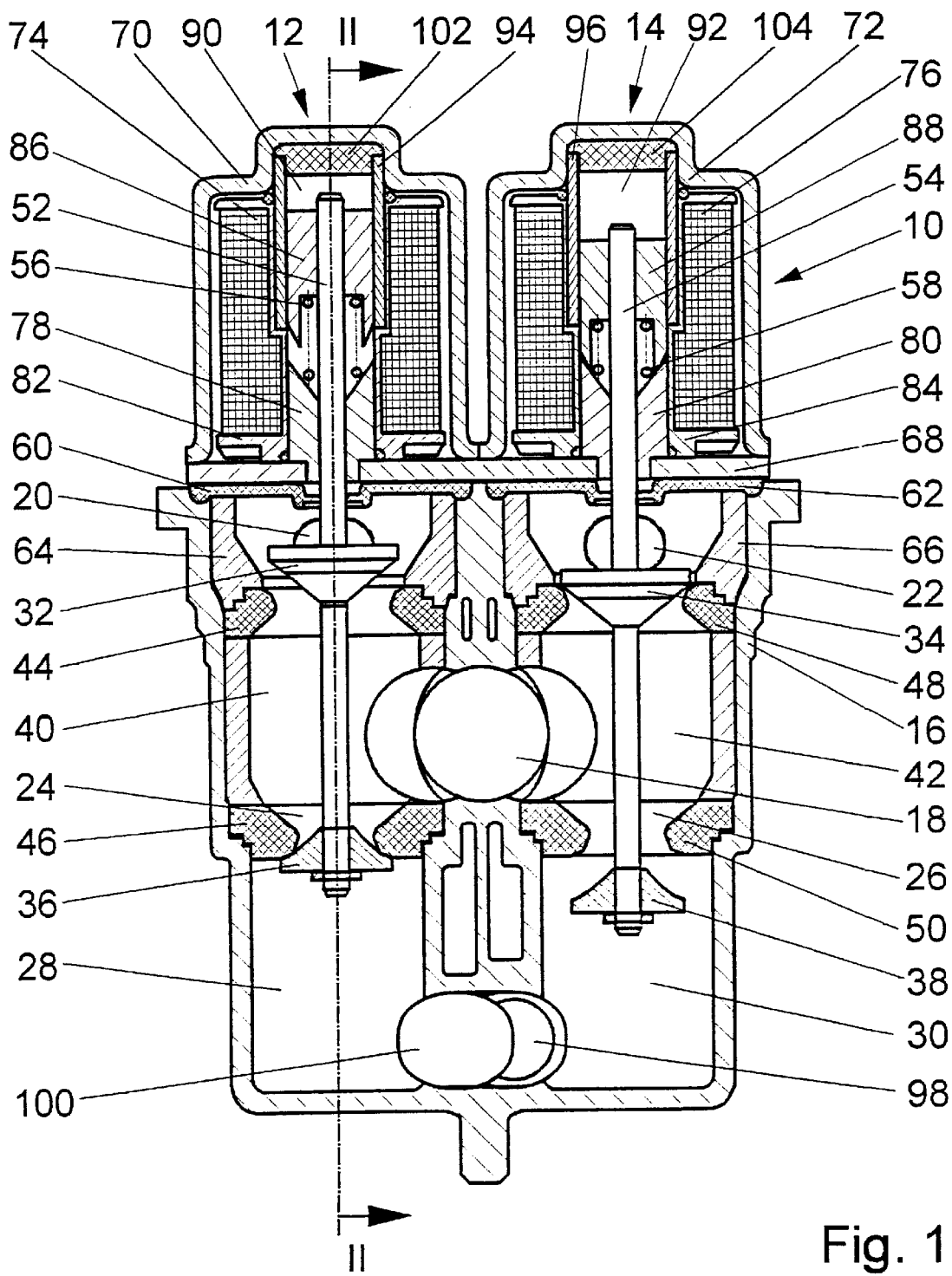
Figure 2:
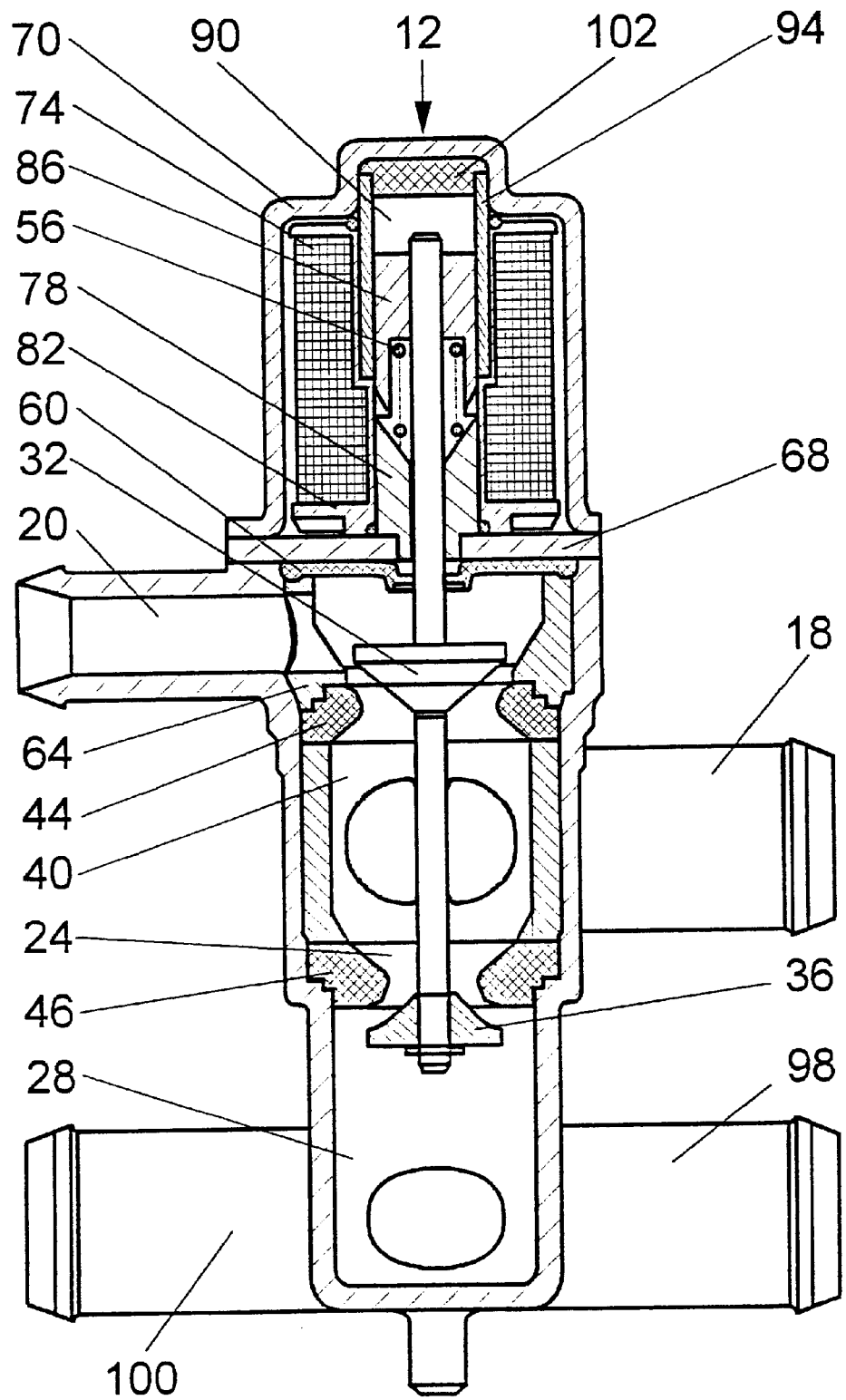

The magnet valve 10 of FIGS. 1 and 2 is disposed in a forward flow line 106 between an internal combustion engine 116 and heating heat exchangers 108, 110. It has two valve units 12, 14, which are inserted in a valve housing 16. The valve housing 16 has a common inlet conduit 18, which communicates with a pump 118 driven by the engine 116, for both valve units 12, 14. It also has two outlet conduits 20, 22, which communicate with different heating heat exchangers 108, 110. As a rule, the heating heat exchangers are assigned to different locations in the vehicle, such as the driver side and the front passenger side.

The valve units 12 and 14 are embodied identically. They have a magnet coil 74, 76 with a coil body 82, 84 and a magnet core 78, 80. The magnet coil 74, 76 is accommodated in a magnet cup 70, 72, which is secured to the valve housing 16 via a supporting wall 68. An armature 86, 88 is guided axially displaceably in a guide bush 94, 96 in the magnet coil 74, 76. A cap 102, 104 closes the guide bush 94, 96, so that between the cap 102, 104, the guide bush 94, 96 and the armature 86, 88, an armature chamber 90, 92 is formed, into which the armature 86, 88 plunges to a variable extent depending on the switching position. The magnetic circuit is formed via the magnet core 78 and 80, armature 86 and 88, guide bush 94 and 96, and magnet cup 70 and 72, respectively, and the support wall 68.

The armature 86, 88 is secured to a lifting rod 52, 54, for instance by welding. The lifting rod 52, 54 extends through the magnet core 78, 80 and the supporting wall 68 into the valve housing 16 and through a valve chamber 40, 42 on into a return chamber 28, 30. A diaphragm seal 60, 62, which rests on the lifting rod 52, 54, is disposed on the supporting wall 68 toward the valve housing 16.

The valve chamber 40, 42 is inserted as a separate component into the valve housing 16, and on its ends it has valve seats 44, 48 and 46, 50, which are expediently also made as separate components from an elastomer.

As a result, the valve chamber 40, 42 with the valve seats 44, 48 and 46, 50 can easily be replaced and adapted to a given application. A spacer piece 64, 66, into which the outlet conduit 20, 22 discharges, is provided between the valve chamber 40, 42 and the supporting wall 68.

Toward the outlet conduit 20, 22, a valve member 42, 44 is seated on the lifting rod 52, 54 and cooperates with the valve seat 44, 48. A bypass valve member 36, 38, which cooperates with the valve seat 46, 50 and controls a bypass conduit 24, 26 is also seated on the end of the lifting rod 52, 54 toward the return chamber 28, 30. The common inlet conduit 18 for both valve units 12 and 14 extends between the valve chambers 40 and 42 and intersects them over a sufficient range of their circumference between the valve seats 44, 48 and 46, 50. The communication between the two valve chambers 40 and 42 is thus established.

The valve members 32 and 34 with their associated valve seats 44 and 48, and the bypass valve members 36 and 38 with their associated valve seats 46 and 50, are adapted to one another, together with the associated valve springs 56 and 58, that in the currentless state of the magnet coils 74 and 76, the valve members 32, 34 are opened and uniformly distribute the available volumetric flow, pumped by the pump 118, to the outlet conduits 20 and 22. If the volumetric flow rises beyond a predetermined extent, the bypass valve members 36 and 38 open, counter to the force of the associated valve springs 56 and 58. As a result, the excess volumetric flow flows into the return conduit 98, via the bypass conduits 24, 26 and the return chambers 28 and 30. The return conduit 98 has a connection 100 a connecting line to the heating heat exchangers 108, 110. The connection 100 is expediently offset from the return conduit 98 that establishes the communication with the pump 118, in order to attain an adequate, communicating overlap in the partition between the return chambers 28 and 30 when the conduit cross sections are small.

FIG. 2 shows the valve member 32 of the valve unit 12 in an intermediate position, in which the predetermined flow quantity is attained and is kept constant. The view in FIG. 2 differs from that in FIG. 1 in the respect that the valve member 32 is fully opened and the bypass valve member 36 is closed.

The flow quantity of the various valve units 12, 14 can be varied as a function of temperature, by triggering the magnet coils 74 or 76 in clocked fashion, either singly or jointly. If a magnet coil 74 or 76 is excited, the associated armature 86 or 88 is attracted by the magnet core 78 or 80, counter to the force of the associated valve spring 56 or 58, and the corresponding valve member 32 or 34 closes while the corresponding bypass valve member 36 or 38 opens.

FIG. 1 shows the valve unit 14 in a state where current is supplied to the magnet coil 76. The magnet coil 74 of the valve unit 12 is conversely currentless, and the predetermined flow quantity has not yet been exceeded, so that the valve member 32 is open and the bypass valve member 36 is closed.

Figure 3:
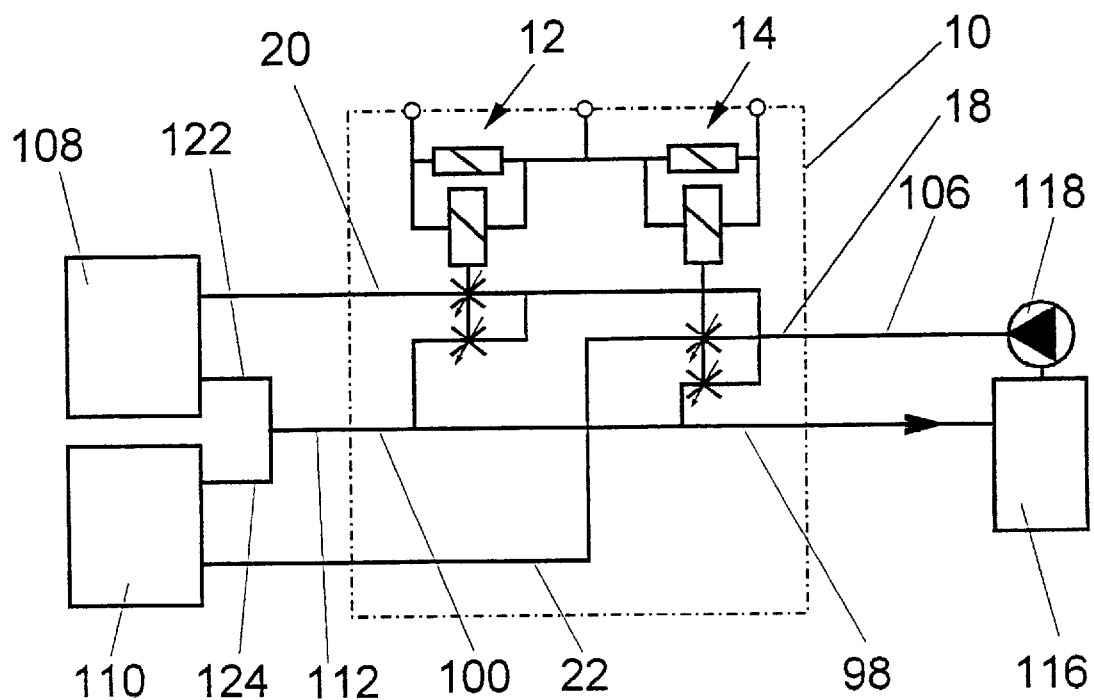
Figure 4:
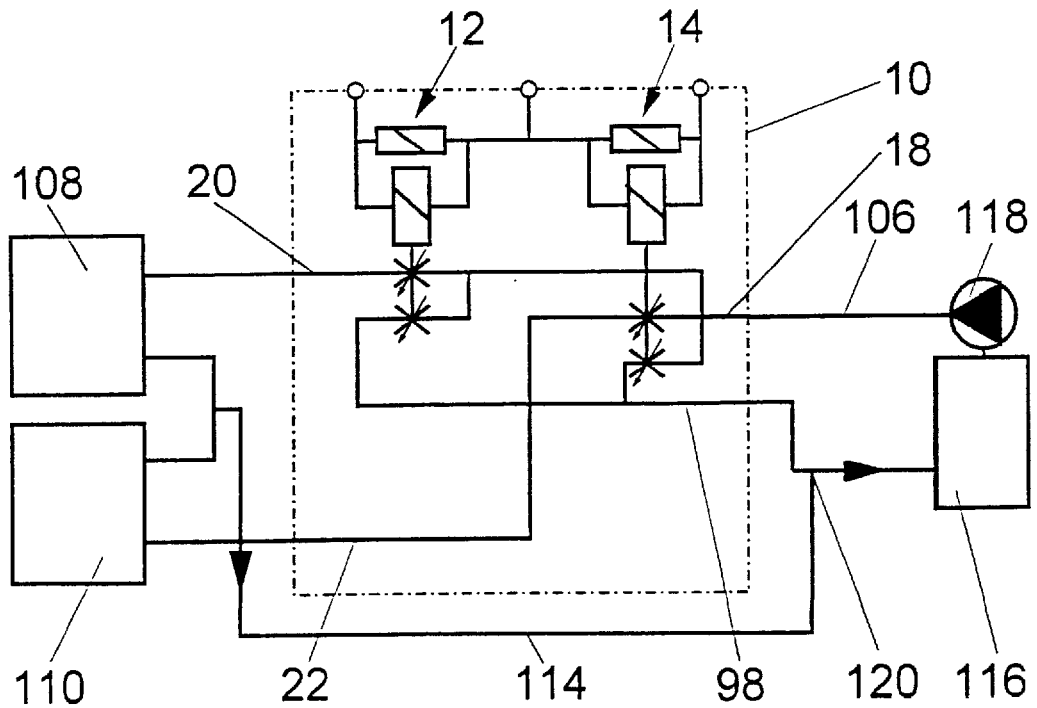

In the exemplary embodiment of FIGS. 1–3, the return line 112 extends from the heating heat exchangers 108, 110 via the magnet valve 10, specifically via the connection 100 and the return conduit 98. It may be expedient for the magnet valve 10 to act as a communication between separately extending return lines 122 and 124, by having the return lines 122, 124 communicate with the return conduit 98 via conduits in the magnet valve 10. Depending on the three-dimensional arrangement of the heating heat exchangers 108, 110, magnet valve 10 and engine 116, it may be expedient for the return line 112 to extend from the heating heat exchangers 108, 110 not via the magnet valve 10 but instead for one return line 114 to be laid over a shorter or more favorable path to the engine 116 and be connected to the cooling system of the engine (FIG. 4). In that case, the connection 100 can be dispensed with, and the return conduit 98 is connected at some suitable point 120 of the vehicle to the return line 114 that leads from the heating heat exchangers 108, 110 to the engine 116.

What is claimed is:

1. A magnet valve (10) for a fuel-regulated heating and/or cooling system, having a valve housing (16) that has an inlet conduit (18), an outlet conduit (20, 22), a return conduit (98), and a bypass conduit (24, 26) between the inlet conduit (18) and the return conduit (98), and having an electromagnetically switched valve member (32, 34) and bypass valve member (36, 38), which are secured together with an armature (86, 88) to a lifting rod (52, 54), and the valve member (32, 34) establishes the communication between the inlet conduit (18) and the outlet conduit (20, 22) and blocks it in a switching position in which it is supplied with current, while the bypass valve member (36, 38) controls the communication between the bypass conduit (24, 26) and the return conduit (98) as a function of the feed flow in the currentless switching position and establishes it in the switching position in which it is supplied with current, characterized in that a plurality of valve units (12, 14) are provided, whose inlet conduits (18) communicate with one another.

2. The magnet valve (10) of claim 1, characterized in that the valve units (12, 14) are disposed in a common valve housing (16).

3. The magnet valve (10) of claim 2, characterized in that each valve unit (12, 14) has a valve chamber (40, 42) that can be inserted into the valve housing (16), and each valve chamber has one valve seat (44, 46; 48, 50) toward the outlet conduit (20, 22) and return conduit (98), which valve seat cooperates with the respective valve member (32, 34) or bypass valve member (36, 38), and that a common inlet conduit (18) connects the valve chambers (40, 42) with one another.

4. The magnet valve (10) of claim 3, characterized in that the valve seats (44, 46) are made from an elastomer.

5. The magnet valve (10) of claim 1, characterized in that the effective diameters of the valve seats (44, 46; 48, 50), valve members (32, 34) and bypass valve members (36, 38) and the force of valve springs (56, 58) acting on the valve members (32, 34, 36, 38) are adapted to one another in such a way that the flow quantity to the outlet conduits (20, 22) at the currentless valve units (12, 14) is independent at all the valve units (12, 14) from the instantaneous feed quantity of a pump (118), and that this flow quantity at the currentless valve units (12) is preserved even if another valve unit (14) has current flowing through it.

6. The magnet valve (10) of claim 5, characterized in that the valve springs (56, 58) are designed such that the bypass valve members (36, 38) of the currentless valve units (12) do not open until a predetermined feed quantity of the pump (118) is attained.

7. The magnet valve (10) of claim 1, characterized in that a common return conduit (98) is provided, which connects return chambers (28, 30) of the valve units (12, 14) with one another.

8. The magnet valve (10) of claim 1, characterized in that a return line (112) of the heating heat exchangers (108, 110) is connected to a connection (100) of the magnet valve (10).

9. The magnet valve (10) of claim 1, characterized in that from the heating heat exchangers, return lines (122, 124) are separate until the magnet valve (10) and then via conduits inside the magnet valve (10) communicate with the return conduit (98).

* * * * *